United States Patent [19]

Yeakley et al.

[11] Patent Number: 4,891,724
[45] Date of Patent: Jan. 2, 1990

[54] DISK DRIVE READ/WRITE HEAD RACK FLEXIBLE RAIL MOUNT APPARATUS

[75] Inventors: Lester M. Yeakley; Hessam Taqhdir, both of Boulder, Colo.

[73] Assignee: Storage Technology Corporation, Louisville, Colo.

[21] Appl. No.: 237,765

[22] Filed: Aug. 29, 1988

[51] Int. Cl.[4] .................................................. G11B 5/55
[52] U.S. Cl. ..................................... 360/106; 360/104
[58] Field of Search ................. 360/106, 105, 104, 109

[56] References Cited

U.S. PATENT DOCUMENTS 4,703,377 10/1987 Hazebrouck ........................ 360/106

FOREIGN PATENT DOCUMENTS 0223610 5/1987 European Pat. Off. ............ 360/106
61-196475 8/1986 Japan ..................... 360/106

*Primary Examiner*—John H. Wolff
*Assistant Examiner*—Matthew J. Bussan
*Attorney, Agent, or Firm*—Dorr, Carson, Sloan & Peterson

[57] ABSTRACT

The disk drive read/write head actuator track apparatus consists of a rail having a rail mount at either end to secure the rail to the frame of the disk drive system. The rail is oriented in a radial direction so that, as the read/write head actuator mechanism traverses the length of the rail, the read/write heads move in a radial direction from the spindle to the perpihery of the disks. The rail mount at one end of the rail rigidly connects the rail to the disk drive frame in a location proximate to the perpihery of the disks. This first rail mount precisely locates the one end of the rail with respect to a point on the frame of the disk drive system and is constructed in a way that renders it resistant to flexure in any direction. The other end of the rail is connected to a second rail mount which is attached to the frame of the disk drive system in a location proximate to the spindle of the disk drive system. The second rail mount is flexibly deformable in a radial direction but is resistant to flexure in directions that are orthogonal to the radial direction. Thus, the two rail mounts used to secure the rail to the frame of the disk drive system prevent positional movement of the rail with respect to the frame of the disk drive system in directions that are orthogonal to the radial direction.

4 Claims, 2 Drawing Sheets

FIG. 4.—PRIOR ART

DISK DRIVE READ/WRITE HEAD RACK FLEXIBLE RAIL MOUNT APPARATUS

FIELD OF THE INVENTION

This invention relates to disk drive systems and in particular to track apparatus that is used to precisely position the read/write heads over the data storage tracks of the data storage medium.

PROBLEM

It is a problem in the field of disk drive systems to provide a precise positioning mechanism for the read/write heads. A disk drive system typically consists of a frame that supports a spindle on which rotate one or more circular disks of data storage media. The circular data storage media or disks revolve at a fixed velocity around the central spindle. The data storage media are made from a magnetic material and have imprinted thereon a plurality of concentrically arranged circular data storage tracks. In order to read and write data on the data storage tracks of this data storage media, a plurality of read/write heads are used, typically two for each side of each disk.

All of the read/write heads are connected to the same actuator mechanism which moves in a radial direction from a location proximately located near the spindle to a point near the edge or circumference of the disks. The actuator mechanism typically includes an actuator rail located at the end of the spindle, oriented in this radial direction. The actuator mechanism functions to precisely position each read/write head at a predetermined radius on the surface of the associated rotating disk, above a selected data storage track on the data storage media.

In such a configuration, it is obvious that the actuator track system must be precisely aligned in a radial direction and not be susceptible to any bowing or tilting because such positional misalignments cause data storage track misregistration. With the increase in data storage capacity of the magnetic materials used to fabricate the data storage media, there are an increased number of data storage tracks per disk as well as a decreased width of the data storage track. Thus, the registration of the read/write heads with respect to the data storage tracks becomes more and more critical as the data storage capacity of the disk system increases.

A significant contributor to data storage track misregistration is the tilting and bowing of the actuator track system on which the actuator mechanism rides. The actuator track system is typically made of a high quality material such as stainless steel while the frame in which the entire disk drive system is packaged is typically made of aluminum. The co-efficient of thermal expansion of these two materials differ so that temperature fluctuations in the disk drive system cause the actuator track system and the disk drive frame to which it is attached to expand and contract at different rates. The actuator track system typically consists of a rail, at either end of which is provided a rail mount to affix the end of the rail to the disk drive frame. As the disk drive frame and the actuator track rail expand and contract, the difference in thermal expansion and contraction rates is compensated for by the rail mounts at either end of the rail. These rail mounts will flex primarily in a radial direction but also in directions orthogonal to the radial direction. The flexing of these rail mounts causes the rail to bow in the middle and to change its alignment with respect to the spindle and the disk surface. Thus, as the actuator mechanism traverses the length of the rail, the registration of the read/write head with respect to the data storage track changes due to the bow in the rail. Since the positioning of the read/write head with respect to the data storage track requires extremely precise tolerances and is nominally a very small distance, such bowing can cause track misregistration. In addition, bowing or tilting of the rail also causes misalignment of the read/write heads with the data storage tracks.

SOLUTION

The above described problems are solved and a technical advance achieved in the field by the disk drive read/write head actuator track apparatus of this invention. This actuator track apparatus consists of a rail having a rail mount at either end to secure the rail to the frame of the disk drive system. The rail mount at one end of the rail rigidly connects the rail to the disk drive frame in a location proximate to the outer edge or periphery of the disks. This first rail mount precisely locates the one end of the rail with respect to a point on the frame of the disk drive system and is constructed in a way that renders it resistant to flexure in any direction. The other end of the rail is connected to a second rail mount which is attached to the frame of the disk drive system in a location proximate to the spindle of the disk drive system. The rail is oriented in a radial direction so that, as the read/write head actuator mechanism traverses the length of the rail, the read/write heads move in a radial direction from the spindle to the periphery of the disks. The second rail mount located near the spindle fastens the second end of the rail to the frame of the disk drive system in a less rigid fashion than the first rail mount secures the first end of the rail to the frame of the disk drive system. In particular, the second rail mount is flexibly deformable in a radial direction but is resistant to flexure in directions that are orthogonal to the radial direction. Thus, the two rail mounts used to secure the rail to the frame of the disk drive system prevent positional movement of the rail with respect to the frame of the disk drive system in directions that are orthogonal to the radial direction. The two disk drive mounts also permit positional misalignment between the rail and the frame of the disk drive system in a radial direction only at the spindle of the disk drive system. Thus, the rail and the associated read/write heads are accurately positioned with respect to the disks in the disk drive system. The rail of the actuator track system remains precisely oriented with respect to the data storage tracks on the disks since the rail of the actuator track system is precisely positioned in a radial direction and with respect to the spindle of the disk drive system.

The second rail mount located near the spindle of the disks not only provides flexure only in a radial direction but also eliminates bowing of the rail by flexing in a radial direction such that the top of the rail mount remains parallel to the surface of the disks. This is accomplished by using a rail mount that has a top, bottom, first and second sides which are arranged in the form of a rectangle. The top and bottom segments of the second rail mount are rigidly constructed while the first and second sides are constructed so that the joints between the sides and top and bottom sections of the rail mount allows a certain amount of pivoting. As the rail and frame are positionally misaligned with each other due to differing coefficient of thermal expansion, the rectangular shape of the rail mount will be deformed into the shape of a parallelogram. The use of this architecture of the second rail mount maintains the top and bottom sections of the rail mount in a parallel orientation with respect to each other thereby maintaining the surface of the rail in a parallel orientation with respect to the surface of the disks in the disk drive system.

BRIEF DESCRIPTION OF THE DRAWING

FIG. 4 illustrates a prior art track apparatus.

DETAILED DESCRIPTION OF THE DRAWING

Figure 3:
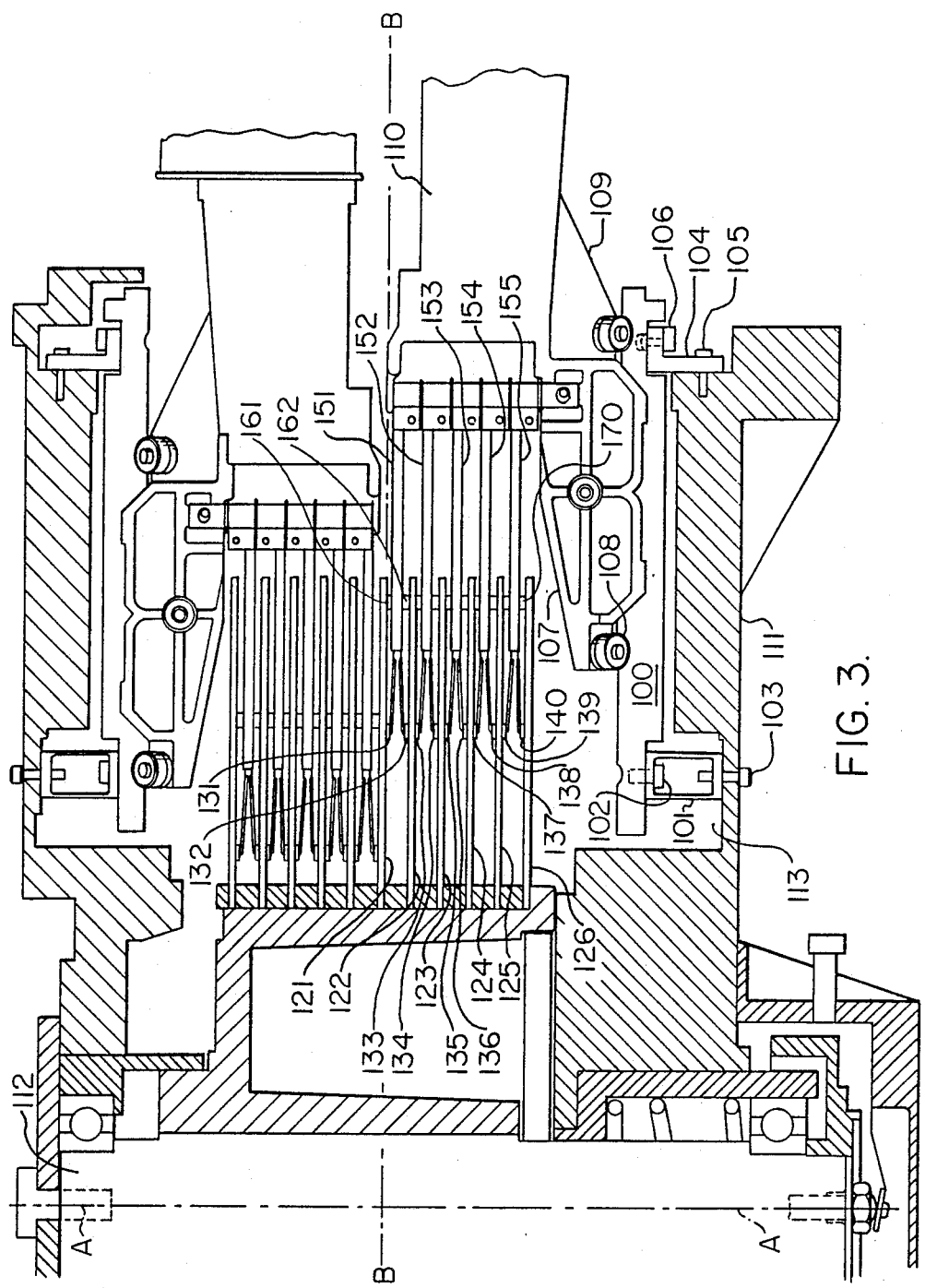
FIG. 3 illustrates a side view of the disk drive system illustrating the location of the track system therein.

FIG. 3 illustrates a side view of a typical disk drive system. This illustration has removed therefrom many of the details found in a typical disk drive in order to simplify the illustration. In addition, the disk drive system contains two identical actuator mechanisms and the associated read/write heads and disks. These mechanisms are a mirror image of each other about the dashed line B—B shown in FIG. 3. Therefore, to simplify this description, only the apparatus located below line B—B is described in detail below.

A disk drive system typically consists of a frame 111 that supports a spindle 112 on which rotate one or more circular disks 121-126 of data storage media about center line A-A of spindle 112. The circular data storage media or disks 121-126 revolve at a fixed velocity around a central spindle 112. The data storage media are made from a magnetic material and have imprinted thereon a plurality of concentrically arranged circular data storage tracks. In order to read and write data on the data storage tracks of this data storage media, a plurality of read/write heads 131-140 and 161-170 are used, typically two per side of each disk 121-126.

All of the read/write heads 131-140 and 161-170 are connected to the same actuator mechanism 110 which moves in a radial direction from a location proximately located near the spindle 112 to a point near the edge or circumference of the disks 121-126. The actuator mechanism 110 typically includes an actuator track system located at one end of the spindle 112 oriented in this radial direction. The actuator mechanism 110 functions to precisely position each read/write head 131-140 and 161-170 at a predetermined radius on the surface of the associated rotating disk 121-126, above a selected data storage track on the data storage media. This is accomplished by using one of the read/write heads, say 161, as a read-only servo head to sense prerecorded servo tracks on the lower surface of disk 124. A servo mechanism including the prerecorded servo tracks, the servo head, servo control electronics, and the actuator with a linear motor positions the servo heads 161 precisely over the desired prerecorded servo track. When the servo heads 161 is precisely positioned over a servo track each of the read/write heads 131-140, 161-170 must be precisely positioned over its respective data track for the purpose of writing or reading data.

In such a configuration, it is obvious that the actuator track system must be precisely aligned in a radial direction and not be susceptible to any bowing or tilting because such positional misalignments cause data storage track misregistration. With the increase in data storage capacity of the magnetic materials used to fabricate the data storage media, there are an increased number of data storage tracks per disk 121-126 as well as a decreased width of the data storage track. Thus, the registration of the read/write heads 131-140 and 161-170 with respect to the data storage tracks becomes more and more critical as the data storage capacity of the disk system increases.

A significant contributor to data storage track misregistration is the tilting and bowing of the actuator track system on which the actuator mechanism 110 rides. The actuator track system is typically made of a high quality material such as stainless steel while the frame 111 in which the entire disk drive system is packaged is typically made of aluminum. The co-efficient of thermal expansion of these two materials differ so that temperature fluctuations in the disk drive system cause the actuator track system and the disk drive frame 111 to which it is attached to expand and contract at different rates. The actuator track system typically consists of a rail 100, at either end of which is provided a rail mount 101, 104 to affix the end of the rail 100 to the disk drive frame 111. As the disk drive frame 111 and the actuator track rail 100 expand and contract, the difference in thermal expansion and contraction rates is compensated for by the mounts 101, 104 at either end of the rail 100.

Actuator mechanism 110 includes a plurality of arms 151-155 each of which supports corresponding ones of read/write heads 131-140 and 161-170 adjacent to associated disks 121-126. A guide frame 107, including a plurality of rollers (ex 108, 109), rides along rail 100 in a radial direction between the rail mounts 101, 104. The radial motion of actuator mechanism 110 is accomplished by the use of an associated linear motor (not shown) that precisely positions actuator mechanism 110 in the radial direction. Frame 111 includes an indentation 113 into which rail mount 101 is placed. Bolts 102, 103 secure rail mount 101 to rail 100 and frame 111, respectively. Similarly, bolts 106, 105 secure rail mount 104 to rail 100 and frame 111, respectively. Thus, rail mounts 101, 104 secure rail 100 to frame 111 and position rail 100 such that the top surface of rail 100, on which actuator mechanism 110 rides, is parallel to the surfaces of disks 121-126 and likewise frame 111.

Prior Art Rail Mounts

A typical prior art actuator track system is illustrated in FIG. 4. Rail 400 is secured by rail mounts 401, 402 to frame 410. Bolts 403, 404 and 405, 406 secure rail mounts 401, 402 to rail 400 and frame 410, respectively. Rail mounts 401, 402 are in the shape of a Z and L, respectively. As rail 400 and frame 410 expand and contract, rail 400 bows and tilts, as shown in exaggerated form by the dotted line overlay drawing of rail 400 and rail mounts 401, 402. The use of L or Z shaped rail mounts 401, 402 do not prevent motion in directions orthogonal to the radial direction and can cause deformation of rail 400. These mounts 401, 402 flex primarily in a radial direction but also in directions orthogonal to the radial direction. The flexing of these rail mounts 401, 402 causes the rail 400 to bow in the middle. Thus, the actuator mechanism 110 is caused to tilt either forward or backward depending on its location on rail 400 and depending on the temperature of the disk drive. Tilting of the actuator mechanism 110 with respect to the disks 121-126 causes positioning errors in the read/- write heads 131–140, 131a–136a, 138a–140a even When the servo heads 137a is precisely positioned on a servo track. Since the positioning of the read/write heads 131–140, 131a–136a, 138a–140a with respect to data tracks on the disk surface requires extremely precise tolerances and is nominally a very small distance, such bowing can cause track misregistration.

Actuator Track Apparatus

Figure 1:
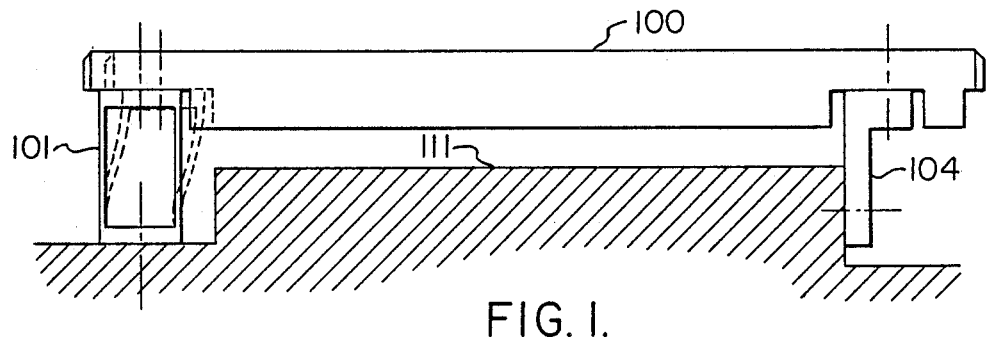
FIG. 1 illustrates a side view of the disk drive read/write head track apparatus.

The disk drive read/write head actuator track apparatus of the present invention consists of a rail 100 having a rail mount 101, 104 at either end to secure the rail 100 to the frame 111 of the disk drive system (FIGS. 1 and 3). The rail mount 104 at one end of the rail 100 rigidly connects the rail 100 to the disk drive frame 111 in a location proximate to the periphery of the disks 121–126 in the disk drive system. This first rail mount 104 precisely locates the one end of the rail 100 with respect to a fixed point in the frame 111 of the disk drive system and is constructed in a way that renders it resistant to flexure in any direction. The other end of the rail 100 is connected to a second rail mount 101 which is attached to the frame 111 of the disk drive system in a location proximate to the spindle 112 of the disk drive system. The rail 100 is oriented in a radial direction so that, as the read/write head actuator mechanism 110 traverses the length of the rail 100, the read/write heads 131–140 and 161–170 move in a radial direction from the spindle 112 to the periphery of the disks 121–126. The second rail mount 101 located near the spindle 112 fastens the second end of the rail 100 to the frame 111 of the disk drive system in a less rigid fashion than the first rail mount 104 secures the first end of the rail 100 to the frame 111 of the disk drive system. In particular, the second rail mount 101 is flexibly deformable in a radial direction but is resistant to flexure in directions that are orthogonal to the radial direction. The two rail mounts 101, 104 used to secure the rail 100 to the frame 111 of the disk drive system prevent positional movement of the rail 100 with respect to the frame 111 of the disk drive system in directions that are orthogonal to the radial direction. The two disk drive mounts 101, 104 also permit positional misalignment between the rail 100 and the frame 111 of the disk drive system in a radial direction only at the spindle 112 of the disk drive system. Thus, the rail 100 and the associated read/write heads 131–140 and 161–170 are accurately positioned with the disks 121–126 in the disk drive system. The rail 100 of the actuator track system remains precisely oriented with respect to the data storage tracks on the disks 121–126 since the rail 100 of the actuator track system is precisely positioned in a radial direction and with respect to the spindle 112 of the disk drive system.

Flexible Rail Mount

The second rail mount 101 (illustrated in perspective view in FIG. 2) located near the spindle 112 of the disk drive system not only provides flexure only in a radial direction but also eliminates bowing of the rail 100 by flexing in a radial direction such that the top of the rail mount 101 remains parallel to the surface of the disks 121–126. This is accomplished by using a rail mount 101 that has a top 201, bottom 202, first 203 and second 204 sides which are arranged in the form of a rectangle as viewed from the side. The top 201 and bottom 202 segments of the second rail mount 101 are rigidly constructed while the first 203 and second 204 sides are constructed so that the joints between the sides 203, 204 and top 201 and bottom 202 sections of the rail mount 101 allow a certain amount of pivoting.

FIG. 1 illustrates a side view of the actuator track mechanism. As the rail 100 and frame 111 are positionally misaligned with each other due to differing coefficients of thermal expansion, the rectangular shape of the rail mount 101 is deformed substantially into the shape of a parallelogram as shown in exaggerated form by the dotted lines in FIG. 1. The use of this architecture of the second rail mount 101 maintains the top 201 and bottom 202 sections of the rail mount 101 in a parallel orientation with respect to each other thereby maintaining the surface of the rail 100 in a parallel orientation with respect to the surface of the disks 121–126 in the disk drive system.

Figure 2:
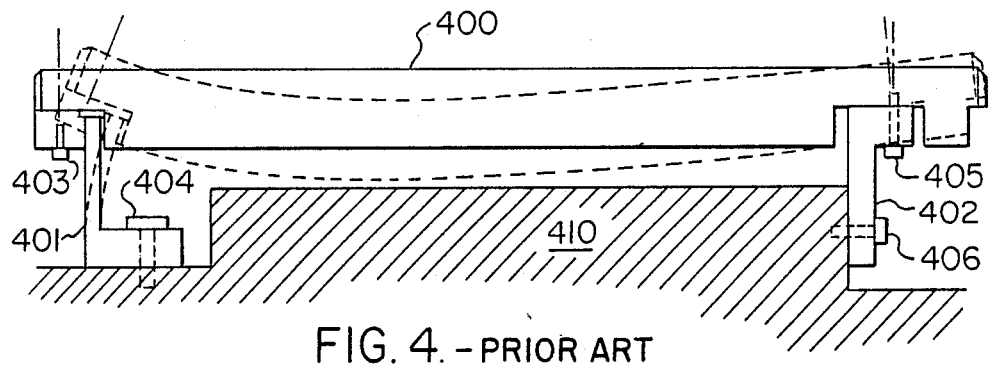
FIG. 2 illustrates a perspective view of one of the rail mounts used in the track apparatus.
Figure 2:
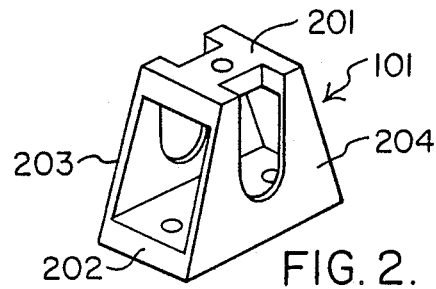

Details of rail mount 101 can be seen in FIG. 2. First 203 and second 204 sides of rail mount 101 are constructed in the shape of a truncated triangle in order to resist deformation in the direction of rotation of disks 121–126. Top 201 and bottom 202 sections of rail mount 101 are in the shape of a rectangle to provide a flat surface on which to mount rail 100.

While a specific embodiment of this invention has been disclosed, it is expected that those skilled in the art can and will design alternate embodiments of this invention that fall within the scope of the appended claims.

We claim:

1. In a disk drive system having a frame and a spindle on which revolves one or more circular data storage media, each of which data storage media includes a plurality of concentrically arranged circular data storage tracks, said disk drive system having one or more read/write heads movable on a carriage along a rail between a first and a second end of said rail in a radial direction above the surface of said data storage media for reading/writing data on said data storage tracks, read/write head rail mount apparatus for providing precise movement of said read/write heads in said radial direction comprising:

first rail mount means connected to said first end of said rail for rigidly connecting said first end of said rail to said frame in a location on said frame proximate to the periphery of said circular data storage media;

second rail mount means connected to said second end of said rail in a location on said frame proximate to said spindle of said circular data storage media for radially flexibly connecting said second end of said rail to said frame including:

top, base, first side and second side sections connected in the shape of a rectangle for supporting said second end of said rail a predetermined distance from the surface of said circular data storage media, and deformable in said radial direction into the shape of a parallelogram for maintaining said top section of said second rail mount means parallel to said surface of said data storage media.

2. The apparatus of claim 1 wherein said first and second side sections of said second rail mount means are deformable for providing positional flexibility in said radial direction between said second end of said rail and said location on said frame proximate to said spindle of said circular data storage media.

3. The apparatus of claim 2 wherein at least one of said first and second sections of said second rail mount means are in the shape of a truncated triangle in a plane parallel to the direction of rotation of said circular data storage media for providing rigidity in directions orthogonal to said radial direction.

4. The apparatus of claim 1 wherein said first side and second side sections of said second rail mount means are of cross section less than said top and base sections of said second rail mount means to enable said second rail mount means to flex in said radial direction into the shape of a parallelogram for maintaining said top section parallel to said surface of said data storage media.

* * * * *